United States Patent [19]

Sand

[11] 3,977,373
[45] Aug. 31, 1976

[54] CLOSED LOOP COMBUSTION PRESSURE CONTROL

[75] Inventor: Darrel R. Sand, Okemos, Mich.

[73] Assignee: General Motors Corporation, Detroit, Mich.

[22] Filed: Sept. 25, 1974

[21] Appl. No.: 508,981

[52] U.S. Cl. .................. 123/117 A; 123/119 A; 123/146.5 A
[51] Int. Cl.² ................. F02P 5/04; F02M 25/06
[58] Field of Search ............... 123/148 E, 146.5 A, 123/117 A, 117 R, 119 A

[56] References Cited
UNITED STATES PATENTS

| | | | |
|---|---|---|---|
| 2,394,792 | 2/1946 | MacMillan | 123/117 A |
| 2,458,086 | 1/1949 | MacMillan | 123/117 A |
| 2,470,709 | 5/1949 | MacMillan | 123/117 A X |
| 3,361,929 | 1/1968 | Vandover | 123/169 R |
| 3,584,521 | 6/1971 | Tooker et al. | 123/117 A X |

Primary Examiner—Charles J. Myhre
Assistant Examiner—Tony M. Argenbright
Attorney, Agent, or Firm—C. K. Veenstra

[57] ABSTRACT

A combustion pressure responsive transducer energizes a solenoid valve assembly which varies an induction passage pressure signal to control a pressure responsive servomotor. The servomotor regulates a combustion parameter to limit peak combustion pressure to a selected value during subsequent combustion events and thus inhibit the formation and emission of oxides of nitrogen. In one embodiment the servomotor regulates the ignition timing, while in a second embodiment the servomotor regulates exhaust gas recirculation.

7 Claims, 4 Drawing Figures

CLOSED LOOP COMBUSTION PRESSURE CONTROL

This invention relates to control of internal combustion engines, and, more particularly, to a closed loop control responsive to combustion chamber pressure for limiting peak combustion pressure to a selected level in order to inhibit the generation and emission of oxides of nitrogen.

There are several mechanisms by which peak combustion pressure may be regulated. For example, it is well known that variation of the spark timing affects the peak combustion pressure. As the timing is advanced, the peak combustion pressure increases up to a maximum while as the timing is retarded, which means that ignition occurs later (in the cycle) the peak combustion pressure decreases. Until recent years, it has seemed logical to run an engine at or near the spark timing which produces maximum peak combustion pressures.

Unfortunately, however, at or near that spark timing oxides of nitrogen are generated at unacceptably high levels in the combustion chambers during the combustion event. In order to inhibit the formation and emission of oxides of nitrogen it is desirable to limit the peak combustion pressure to a selected value. This invention senses the combustion pressure and regulates a combustion parameter, such as ignition timing or exhaust gas recirculation, in order to limit the peak combustion pressures during subsequent events to a selected value.

Devices responsive to combustion pressure, for use in controlling ignition timing, have generally included a calibrated pressure switch which closed when the combustion pressure associated with knock was exceeded. This switch energized a solenoid which mechanically moved the distributor breaker plate to retard the ignition timing and reduce the combustion pressure. During subsequnt cycles when the pressure remained below the knock value, the switch was continuously open. However, with the solenoid thus deenergized, the spring-biased breaker plate would again advance the ignition timing which would tend to increase the combustion pressure.

In the first embodiment of this invention ignition timing is regulated by a servomotor subjected to a subatmospheric induction passage pressure signal. A combustion pressure responsive transducer has an internal switch which is closed while combustion pressure exceeds an established switch closure pressure. While the switch is closed it energizes a solenoid which opens a valve to bleed air to the servomotor and thus provide an increased control pressure signal. Responding to the increased pressure signal, the servomotor retards ignition timing so that during subsequent combustion events the peak combustion pressure will be reduced.

The interrelation between peak combustion pressure, closure duration and pressure of the transducer switch, and spark timing permits this invention to limit peak combustion pressure to a selected value. After an unacceptably high peak combustion pressure is sensed by the transducer, ignition timing is retarded until an equilibrium ignition timing is established where the peak combustion pressure is limited to that selected value for all subsequent combustion events, or until a change in operating conditions occurs.

It should be noted in order to limit the peak combustion pressure to a selected value the switch closure pressure must, of necessity, be lower than the selected peak combustion pressure. Although the switch closure pressure may be fixed, the switch closure duration depends on peak pressure. For instance, for higher peak pressures the switch is closed for a relatively long portion of the cycle and the control pressure signal is increased to retard the timing and reduce the peak pressure. Conversely, when peak pressure is relatively low the switch closure duration is short, the control pressure signal is reduced, and the timing is advanced to increase the peak pressure.

Another mechanism by which combustion pressure may be limited is by recirculation of exhaust gases through the induction passage to the combustion chamber. It is well known that an increase in recirculation of exhaust gases will reduce peak combustion pressure and thus the attendant levels of oxides of nitrogen. Although combining an air-fuel mixture with exhaust gases reduces the peak combustion pressures in a manner different from retarding the spark, exhaust gas may be recirculated in a manner which effectively limits the peak combustion pressures to a selected value.

The mechanism by which exhaust gas recirculation limits peak combustion pressure can best be understood by realizing that the laminar flame speed of the air-fuel-exhaust mixture in the combustion chamber is inversely proportional to the amount of exhaust gas present and that the peak combustion pressure is dependent in part on the laminar flame speed and attendant rate of heat release (and therefore pressure generation). Accordingly, increasing recirculation of exhaust gases lowers the peak combustion pressure;

Many systems for controlling exhaust gas recirculation (EGR) include a pressure responsive servomotor which positions a metering valve member relative to a metering orifice in a recirculation passage connecting the exhaust and induction passages. When sensing low pressures the servomotor displaces the valve from the orifice to allow recirculation to the engine to reduce peak combustion pressures and inhibit the generation of oxides of nitrogen.

In a second embodiment of this invention exhaust gas recirculation is regulated by a pressure responsive servomotor subjected to atmospheric pressure. A combustion pressure responsive transducer has an internal switch which is closed while combustion pressure exceeds an established switch closure pressure. While the switch is closed, it energizes a solenoid which operates a valve to prevent air from bleeding to the servomotor and to permit induction pressure to create a reduced control pressure signal. Responding to the reduced control pressure signal, the servomotor increases the amount of exhaust gas recirculated to the engine. As recirculation increases, the peak combustion pressure during subsequent combustion events is reduced until it regularly and continuously remains below the selected value.

The interrelation between the peak combustion pressure, closure duration and pressure of the transducer switch, and the amount of exhaust gases recirculaed to the combustion chamber permit this embodiment to limit peak combustion pressure to a selected value in a manner similar to that described for the first embodiment.

It is a principal object of the present invention to provide a closed loop combustion pressure control which limits the peak combustion pressure to a selected value by sensing the period of time combustion pressure is above an established pressure and regulating a combustion parameter in accordance with that period to limit the combustion pressure during subsequent combustion events. The closed loop control decreases the peak combustion pressure when the combustion pressure is above the selected value and increases the peak combustion pressure when that pressure is below the selected value.

It is a second object of this invention to regulate ignition timing by means of a pressure responsive servomotor, the pressure signal to which is controlled by a combustion pressure responsive system.

It is a third object of the present invention to regulate recirculation of exhaust gases to the engine by a combustion pressure responsive control system.

Other objects and advantages of the present invention will be made apparent by referring to the detailed description of the invention and to the drawings in which.

Figure 1:
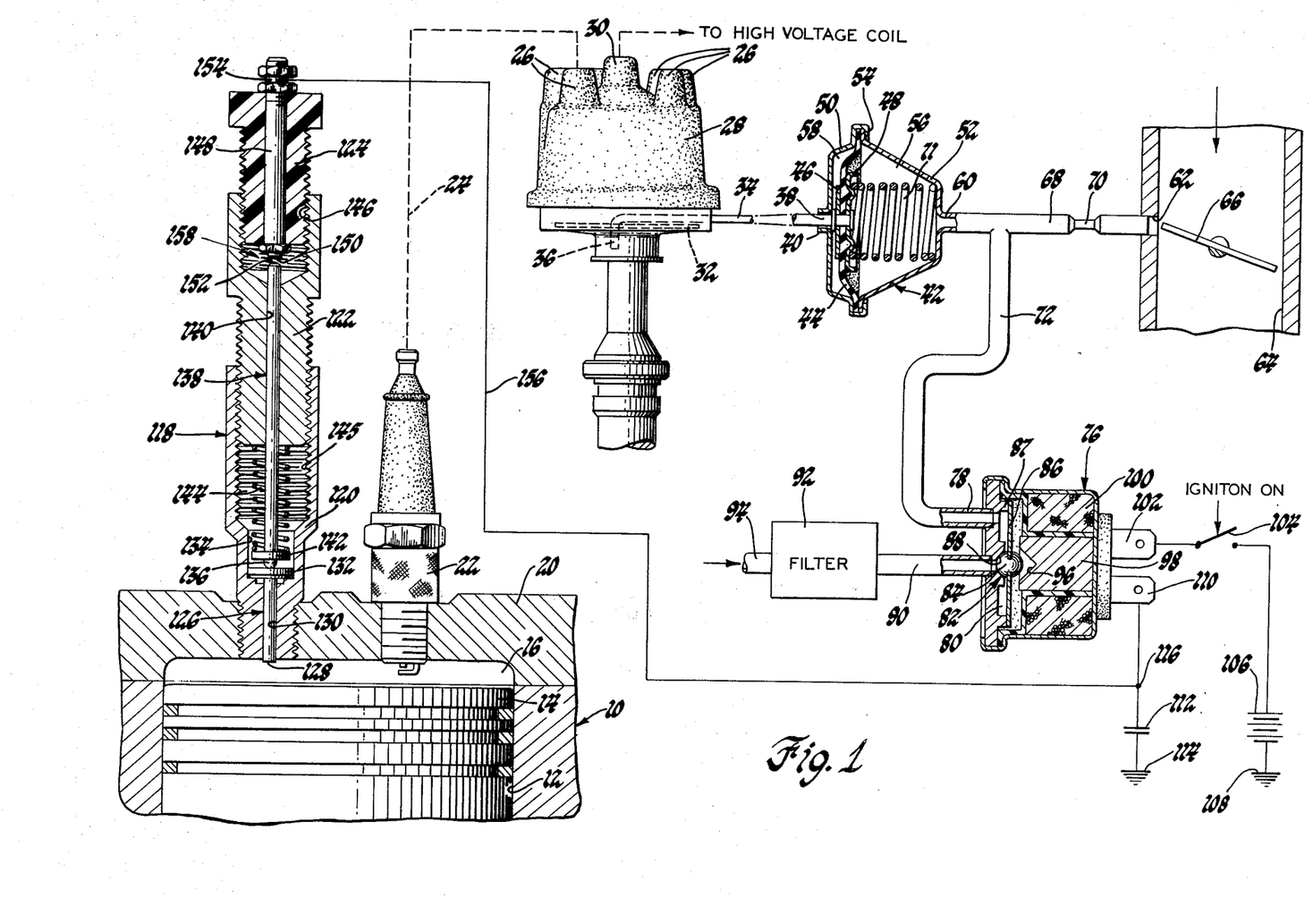
FIG. 1 is a schematic view of the first embodiment of this invention for limiting peak combustion pressure by means which regulate ignition timing in response to that pressure.

Referring first to FIG. 1, an internal combustion engine 10 has a plurality of cylinders 12 and associated pistons 14 sealingly reciprocated therein to form combustion chambers 16 bounded by the pistons, cylinders, and the engine head 20. A plurality of spark plugs 22 are threadedly carried by head 20 in a conventional manner to provide an ignition source for each of the combustion chambers 16. The spark plugs 22 are individually connected by high voltage conductors 24 to the distribution posts 26 of ignition timing means as, for example, a distributor 28. A central post 30 of distributor 28 is connected to a high voltage coil (not shown).

The conventional distributor 28 carries a breaker plate 32 for varying the ignition timing in response to engine operating conditions. An actuating rod 34 has a tang portion 36 which is disposed in a slot in breaker plate 32.

The other end 38 of rod 34 extends axially through a guide portion 40 of a pressure responsive servomotor 42 and is secured in a conventional manner to the center of a flexible circular diaphragm 44 clamped between a pair of diaphragm retainers 46, 48. Diaphragm 44 is further clamped about its periphery between a left cover member 50 and a right cover member 52 by a spun over rim 54 which forces cover member 52, diaphragm 44 and cover member 50 into interengagement.

Diaphragm 44 hermetically partitions servomotor 42 into a pressure chamber 56 between the diaphragm and cover member 52 and an atmospheric chamber 58 between the diaphragm and cover member 50. Air at atmospheric pressure is admitted to chamber 58 through guide portion 40, which is larger in diameter than rod 34 and therefore cannot sealingly engage the rod. A subatmospheric induction passage pressure signal is admitted to pressure chamber 56 by a fitting 60 formed as part of cover member 52. Fitting 60 is connected to, for example, a spark port 62 opening from the air induction passage 64 adjacent to and traversed by the throttle 66. A conduit 68, having a restriction 70, connects pressure chamber 56 to spark port 62.

As throttle 66 traverses spark port 62 during throttle opening movement, an induction passage pressure signal is communicated through restriction 70 and conduit 68 to pressure chamber 56. The combination of unequal gaseous forces occurring on opposite sides of diaphragm 44 will move the diaphragm rightwardly. This moves rod 34 rightwardly and repositions breaker plate 32 to advance the ignition timing in accordance with the pressure signal in chamber 56.

Conversely, when atmospheric air is bled through spark port 62 as throttle 66 closes, the pressure signal in chamber 56 increases to equilibrate pressures on opposite sides of diaphragm 44. A spring 71, compressed between cover member 52 and retainer 48, then is allowed to move diaphragm 44 and actuating rod 34 leftwardly as shown in FIG. 1 to a retarded ignition timing position.

A vent conduit 72 extends from conduit 68 to a solenoid operated valve assembly 76 and through a fitting 78 and to a circular chamber 80 formed therein. A magnetically responsive check valve 82 comprising a central metallic ball 84 and a radially extending plate 86 is disposed in chamber 80. A lefthand circular seat 87 is adapted for sealing registration with plate 86 and a lefthand conical seal 88 is adapted for sealing registration with ball 84. Seal 88 opens to a fitting 90 which is connected to a filter 92 having an atmospheric inlet 94. A righthand conical seat 96 is formed in a core 98. An annular coil 100 surrounds core 98 to form an electromagnetic solenoid for moving magnetically responsive check valve 82. When coil 100 is energized, check valve 82 moves rightwardly and ball 84 seats in conical seat 96 to open chamber 80 to the atmosphere.

A terminal 102 of coil 100 is connected through the ignition switch 104 to an electrical source 106, such as a battery, which is grounded at 108. The other terminal 110 of coil 100 is connected through a capacitor 112 to ground at 114. Thus, when the ignition switch is closed current is applied from battery 106 through switch 104, coil 100 and to capacitor 112 until capacitor 112 accumulates sufficient charge to equal the voltage provided by electrical source 106, whereupon no current will flow through the above-described circuit. However, it should be noted that if the hot side 116 of capacitor 112 is grounded current will flow through coil 100 from battery 106, thereby energizing coil 100 which will move check valve 82 rightwardly against seat 96 to open chamber 80 to the atmosphere.

In operation, when a subatmospheric induction passage pressure signal is supplied through conduit 68 to pressure chamber 56, diaphragm 44 moves rod 34 and breaker plate 32 to an advanced ignition timing position. When this pressure signal is also applied through conduit 72, plate 86 is pulled against circular seat 87 and ball 84 is forced into circular seat 88 thereby preventing atmospheric air from bleeding through inlet 94, filter 92, fitting 90, circular chamber 80 and conduit 72 to pressure chamber 56.

However, when coil 100 is energized, plate 86 and ball 84 are magnetically induced to move rightwardly so that atmospheric air is permitted to bleed through inlet 94, filter 92, fitting 90, circular chamber 80 and conduit 72 to pressure chamber 56. This forms an increased control pressure signal in chamber 56 thereby allowing spring 71 to move diaphragm 44, rod 34 and breaker plate 32 to a less advanced or retarded ignition timing position.

It should be noted that restriction 70 is provided to limit the flow of atmospheric air through conduit 72 and conduit 68 to spark port 62.

A combustion pressure responsive transducer 118 is threadedly carried in engine head 20 in a manner similar to spark plug 22. As shown in FIG. 1, transducer 118 comprises an outer housing 120 which is threadedly carried by head 20. Outer housing 120 threadedly carries an intermediate housing 122 which itself carries a nonconducting adjustment screw 124.

Outer housing 120 receives an axially slidable sensor 126 which has a stem 128 extending through a bore 130 of housing 120. Stem 128 is connected to a flat plate 132 disposed in a larger bore 134 of housing 120. Stem 128 and bore 130 ensure that sensor 126 is constrained to move only axially or vertically as shown, and also ensure that bore 134 is sealed from combustion chamber 16. Gases at superatmospheric pressure, occurring in combustion chamber 16, act on stem 128 of sensor 126 so that it may sense the combustion pressure.

The top surface of plate 132 engages a hemispherical knob 136 of a central stem 138 which is slidably disposed (and thereby constrained to axial movement) in a bore 140 of intermediate housing 122. Stem 138 has a flange 142 which carries knob 136 on the lower side thereof. A calibrated compression spring 144 engages the upper side of flange 142. The preload of spring 144 is adjustable by rotation of intermediate housing 122 relative to outer housing. Spring 144 forces stem 138 and knob 136 against sensor 126 to provide an operative connection therebetween.

It should be noted that central stem 138 is electrically grounded through intermediate housing 122, outer housing 120 and the engine head 20.

The nonconducting adjustment screw 124 is movable axially relative to intermediate housing 122 by means of threads 146. Adjustment screw 124 has a central terminal 148 which has a lower end 150 adapted for contact with an upper end 152 of stem 138 to form a single pole switch 158. Terminal 148 also has a binding post 154 which is connected through a conductor 156 to the hot side 116 of capacitor 112.

The distance between contacts 150 and 152 is adjustable by turning adjustment screw 124 relative to intermediate housing 122. Normally, switch 158 is open because contact 152 does not engage contact 150 and hot side 116 of capacitor 112 is not grounded. However, when switch 158 is closed—that is, when contacts 150 and 152 are engaged—hot side 116 of capacitor 112 is grounded through conductor 156, terminal 146, switch 158, stem 138, intermediate housing 122, outer housing 120 and engine head 20. The pressure at which switch 158 closes is dependent on the distance between contacts 150 and 152, the effective area (exposed to combustion pressure) of stem 128 of sensor 126, the preload of spring 144 (adjustable as indicated above) and the rate of spring 144.

Switch 158 is open when combustion chamber pressure below sensor 126 is insufficient to raise sensor 126 and stem 138 against spring 144. Accordingly, hot side 116 of capacitor 112 is not grounded and coil 100 is deenergized thereby permitting the induction passage pressure signal in chamber 56 to move breaker plate 32 to an advance ignition timing position. However, when combustion chamber pressure exceeds that switch closure pressure, sensor 126 and stem 138 move upwardly against spring 144 to move contact 152 into engagement with stationary contact 150 of terminal 148. Switch 158 closes and grounds terminal 148 (and the hot side 116 of capacitor 112) to energize coil 100. This opens check valve 82 and allows atmospheric air to bleed into conduit 72 to increase the pressure in chamber 56, thereby allowing spring 71 to move breaker plate 32 to a retarded ignition timing position.

Figure 2:
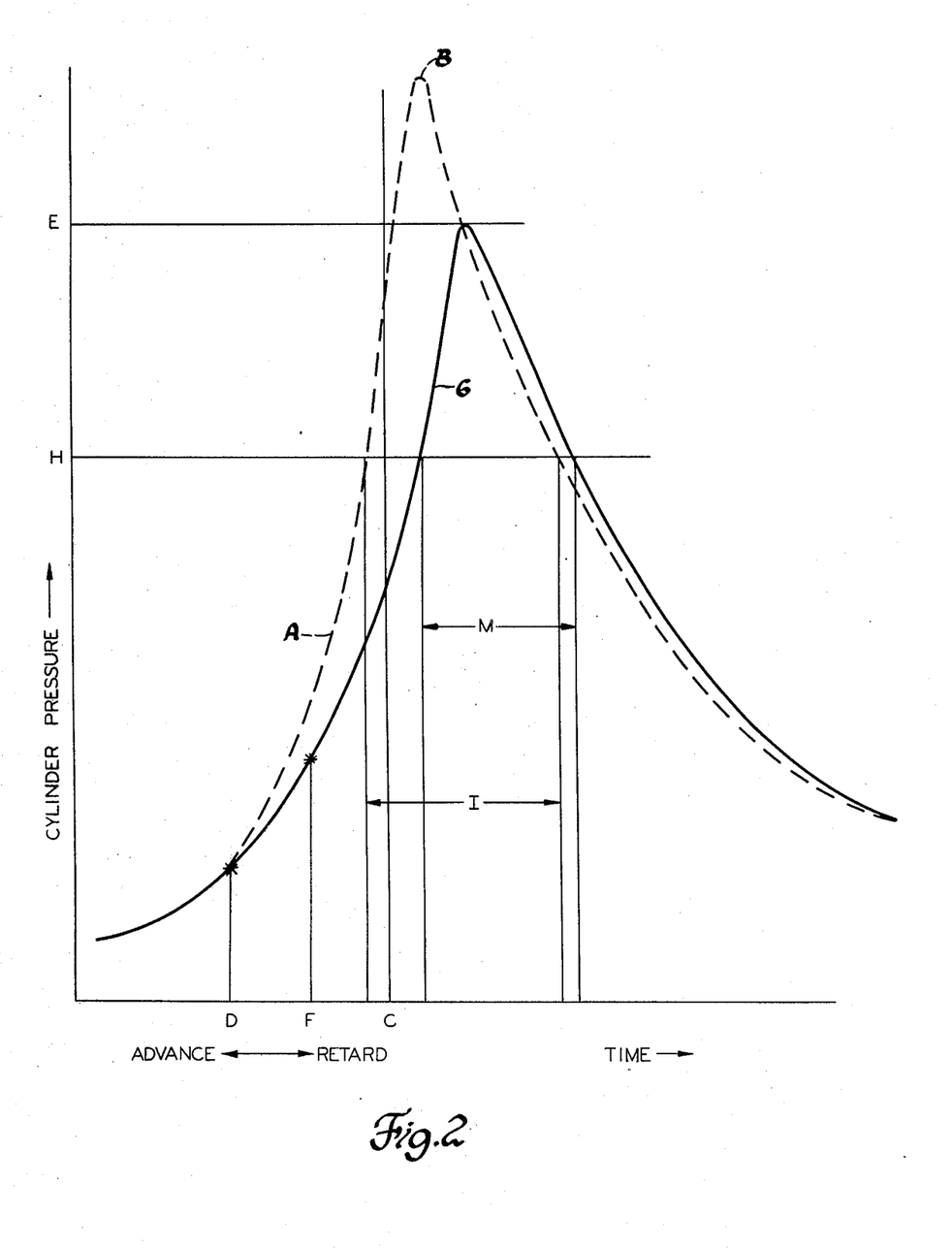
FIG. 2 is a graph of combustion pressure versus time in the combustion cycle illustrating the effects of the first embodiment of the present invention in limiting the peak combustion pressure.

Referring to FIG. 2, which is a graph of combustion pressure versus time in the combustion cycle, the dashed line A, which peaks at B somewhat after top dead center C, is an initial combustion pressure curve which would occur if ignition were at the spark timing D.

High combustion pressures have been shown to correspond to high formation rates of oxides of nitrogen. To inhibit the formation of these undesirable constituents, it is desirable to limit the peak combustion pressure to some empirically obtained value E. This may be achieved by retarding the spark from D to a later timing F. The pressure curve providing the lower peak pressure E and resulting from this retarded ignition timing is shown by a solid line G.

It is important to note that the cyclic nature of the combustion process — that is, the substantially repeatable pressure versus time characteristics of the combustion event — must be taken into account in order to limit peak combustion pressures to a selected value. Since peak pressure occurs before this invention exerts its control over ignition timing, the effect of that control is not manifested until a subsequent combustion event. It should be realized, therefore, that although the finite response time of the system components — for example, transducer 118 and valve assembly 76 — and their effect on the pressure signal in chamber 56 prevents instantaneous control of the combustion pressure, this is not a limitation on the present invention. The closed-loop manner of control of this invention senses combustion pressure during an initial combustion event and varies the control pressure signal accordingly to limit combustion pressures during subsequent combustion events. Thus, there is a minimum system time lag in this control system which reduces the importance of the individual response times of the system components.

An empirical correlation must first establish the peak pressure E needed to limit the formation of the oxides of nitrogen and the associated ignition timing F needed to provide that limited peak pressure E. Second, an empirical correlation between ignition timing and the closure duration M of switch 158 must be established in order to provide that ignition timing F. That duration M then establishes the pressure H at which switch 158 must close to provide ignition timing F.

The operation of this embodiment is as follows: Assume that during an initial air-fuel combustion event the ignition timing is near MBT (D in FIG. 2). This timing is accompanied by a peak combustion pressure B which exceeds the controlled or limiting peak combustion pressure E. Accordingly, switch 158 — which closes at combustion pressure H — is closed for a duration I longer than the duration m associated with peak pressure E. In turn, solenoid operated vent valve 76 is energized for a longer time and therefore bleeds more air to chamber 56 of servomotor 42 to increase the pressure signal. Spring 71 is more effective to move breaker plate 32 in the retard direction and retards the ignition timing toward F. This reduces the peak combustion pressure during subsequent combustion cycle until such time as the peak combustion pressure continuously remains at the limiting value E.

However, if the ignition timing is retarded too far, the peak combustion pressure during subseqent combustion cycles will be less than E and thus the switch closure duration will be less than M so that less air is bled to chamber 56. Accordingly, the subatmospheric pressure occurring at spark port 62 is more effective in reducing the control pressure signal in chamber 56. Thus, diaphragm 44 moves rod 34 and breaker plate 32 and advances the ignition timing toward F to increase the peak combustion pressure during subsequent combustion events.

It should be noted that although capacitor 112 reduces arcing between contacts 150 and 152 of switch 158, its primary purpose is to extend the period of current flow through coil 100. Otherwise, if the combustion pressure were to peak slightly above the pressure H at which switch 158 closes; the resulting abbreviated switch closure times would tend to induce fluttering of solenoid operated valve 82.

It will be appreciated that the closed loop combustion pressure control shown in FIG. 1 is imposed as a trimming function on the basic ignition timing control provided in the usual manner by the speed responsive components of distributor 28 and the load responsive servomotor 42. Thus the approximate basic ignition timing required for appropriate fuel economy, exhaust hydrocarbon emissions, and engine output may be established and then trimmed for appropriate exhaust oxides of nitrogen emissions.

Transducer 118 may be also used to regulate the amount of exhaust gas recirculated to the engine to effectively limit peak combustion pressures. It is well known that combining an air-fuel mixture with exhaust gases will reduce peak combustion pressures in a manner different from retarding the spark. This reduction follows because the laminar flame speed of the fuel-air mixture is inversely proportional, roughly speaking, to the amount of exhaust gas in the combustion chambers. A second embodiment of this invention regulates the amount of exhaust gases recirculated in order to limit the peak combustion pressure to a selected level.

Figure 3:
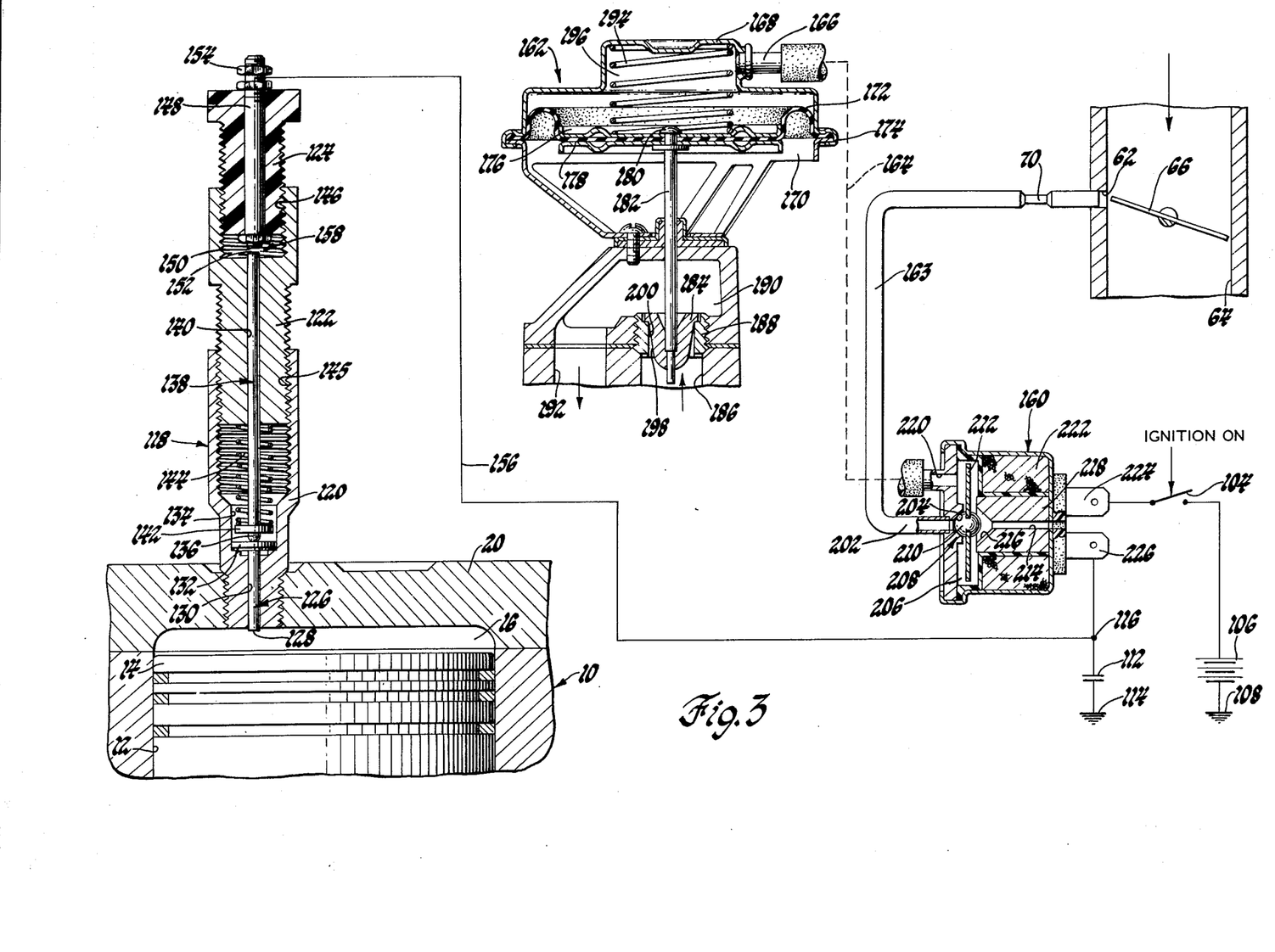
FIG. 3 is a schematic view similar to FIG. 1 showing the second embodiment of this invention for limiting combustion pressure by means which regulate an exhaust gas recirculation in response to that pressure.

Referring to FIG. 3, this second embodiment of the present invention has a solenoid operated check/vent valve assembly 160 for controlling a vacuum responsive exhaust gas recirculation (EGR) valve assembly 162. The structure and location of EGR valve assembly 162 is identical to that set forth in U.S. Pat. No. 3,762,384 Day and Ranft. An induction passage pressure signal is supplied to EGR valve assembly 162 from a port 62, through a restriction 70, a conduit 163, solenoid valve assembly 160, and a conduit 164 to a fitting 166 opening from a cover member 168 of EGR valve assembly 162.

EGR valve assembly 162 includes a servomotor formed by a flexible circular diaphragm 172 clamped between a support member 170 and a spun over portion 174 of cover member 168. Diaphragm 172 is further clamped between a pair of retainers 176, 178 which are secured at their centers to one end 180 of a valve stem 182, the other end of which is secured to a tapered valve pintle 184. Pintle 184 controls the flow of exhaust gases from an exhaust passage 186, through a valve seat 188 and a plenum 190 to a recirculation passage 192 which extends to the induction passage 64 downstream of throttle 66.

A spring 194 biases diaphragm 172, stem 182 and pintle 184 to the position shown in FIG. 3, wherein no recirculation of exhaust gases is permitted. However, when a subatmospheric pressure signal is applied to a pressure chamber 196, formed between diaphragm 172 and cover member 168, the valve stem 182 and valve pintle 184 move upwardly to permit recirculation of exhaust gases to the induction passage 64. It should be noted that valve pintle 184 has a conical tapered portion 198 and seat 182 has a cylindrical portion 200 so that as the valve pintle is raised a greater flow area is provided for metering the exhaust gases.

Conduit 163 is connected to solenoid valve assembly 160 by a central fitting 202 which opens through a conical seat 204 to a circular chamber 206. A valve member 208 is disposed within circular chamber 206 and comprises a magnetically responsive metallic ball 210 and an attached radially extending plate 212. Air at atmospheric pressure is allowed to enter solenoid valve assembly 160 through a vent bore 214 and a conical seat 216 formed in a ferromagnetic core 218 when ball 210 resides in seat 204. Normally, this occurs when subatmospheric pressure, applied to fitting 202, urges ball 210 against seat 204. Thus, air flows through bore 214, around the periphery of plate 212 and through a fitting 220 connected to conduit 164 to vent chamber 196 to the atmosphere. This allows spring 194 to move valve pintle 184 toward seat 188 to restrict recirculation.

An annular coil 222 surrounds core 218 and has a pair of external terminals 224 and 226. Terminal 224 is connected to the ignition switch 104 and terminal 226 is connected to the hot side 116 of capacitor 112 in a manner identical to the previous embodiment.

Transducer 118 in this embodiment is identical in installation and construction to that previously described for the first embodiment and therefore that description will not be repeated here.

Upon closing of ignition switch 104, capacitor 112 will charge until the voltage thereacross equals the voltage of source 106. After switch 158 of transducer 118 closes, which occurs when the combustion pressure exceeds the switch closure pressure H, the hot side 116 of capacitor 112 is grounded. The resulting current through coil 222 causes core 218 to attract valve 208 rightwardly against seat 216. This closes vent bore 214 and allows the subatmospheric pressure signal in conduit 72 to pass through circular chamber 206, fitting 220, and conduit 164 to chamber 196. The combination of gaseous forces occurring above and below diaphragm 172 moves it upwardly to raise valve pintle 184 from seat 188 for recirculation of exhaust gases to the combustion chamber. As previously noted, increasing amounts of recirculation will have the effect of lowering the laminar flame speed and reducing the peak combustion pressure in combustion chamber 16 during subsequent combustion events.

Figure 4:
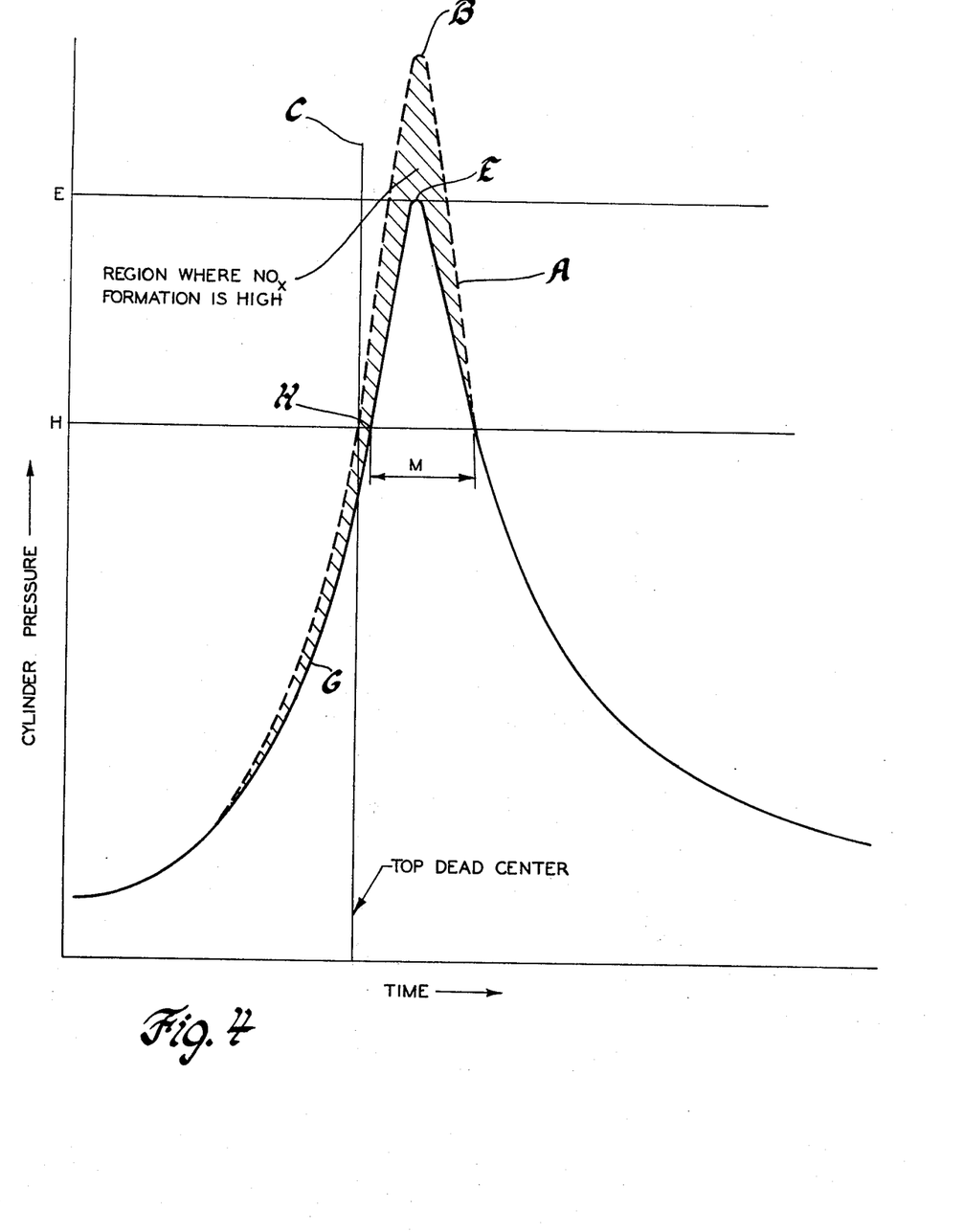
FIG. 4 is a graph of combustion pressure versus time in the combustion cycle suggesting the effects of the second embodiment of this invention in limiting the peak combustion pressure.

The operation of this second embodiment is as follows: Referring to FIGS. 3 and 4 and further assuming as initial conditions that, a high peak combustion pressure exceeds the selected peak combustion pressure E. Accordingly, switch 158, which closes at a lower combustion pressure H, is closed for a duration longer than duration M associated with peak pressure E. Solenoid valve assembly 160 is energized for a longer time and thereby permits the subatmospheric pressure signal originating at port 62 to reduce the pressure in chamber 196. Spring 194 is therefore less effective against the urging of diaphragm 172 so that the diaphragm raises valve pintle 184 and increases the recirculation to the engine. This reduces the peak combustion pressure during subsequent combustion cycles until such time as it falls to the limiting value E.

If, on the other hand, the amount of recirculation is too great, the peak attendant combustion pressure during subsequent combustion events will be less than E and thus the switch closure duration will be less than M so that more air is bled to chamber 196. The increased control pressure in chamber 196 thus is less effective in raising diaphragm 172. Spring 194 therefore lowers valve pintle 184 to reduce the amount of recirculation to the engine. This will increase the peak combustion pressure during subsequent combustion cycles until the limiting value E is obtained.

By empirical establishment of the switch closure pressure H, the necessary duration M for the closure of switch 158 will be established to create the pressure signal in chamber 196 which causes valve assembly 162 to regulate exhaust gas recirculation so the peak combustion pressure will be limited to E.

It must be realized that normally transducer 118 will be actuated and valve assembly 76 or 160 will be energized for a portion of each cycle of the engine. In the case of valve assembly 76, this rapid repeated operation will result in an essentially continuous bleed of air through conduit 72 with a flow rate depending on the proportion of time valve assembly 76 is energized; this continuous air bleed increases the induction passage pressure signal created at port 62 to provide a control pressure signal to chamber 56 which is essentially constant for any one set of engine operating conditions.

Similarly in the case of valve assembly 160, this rapid repeated operation will result in an essentially continuous bleed of air through bore 214 with a flow rate depending on the proportion of time valve assembly 160 is energized, this continuous air bleed increases the induction passage pressure signal created at port 62 to provide a control pressure signal through conduit 164 to chamber 196 which is essentially constant for any one set of engine operating conditions.

In summary, it can be seen that the present invention provides a novel control regulating the pressure signal admitted to a pressure responsive servomotor which governs combustion pressure. The control relies on the sensing of the combustion pressure occurring and varying that control pressure signal accordingly in order to limit combustion pressure to a selected value. The invention thus achieves an improved manner of emission control whereby the generation of undesirable oxides of nitrogen is inhibited.

I claim:

1. An internal combustion engine having a combustion chamber in which a series of combustion events occur and a closed loop combustion pressure control, said control comprising means including a transducer responsive to the pressure in said combustion chamber for creating a control signal which varies with the duration the pressure in said combustion chamber exceeds an established value and thus varies with the peak pressure in said combustion chamber, and means for regulating a combustion parameter in response to variations in said control signal and adapted to regulate said combustion parameter to decrease the peak pressure in said combustion chamber during subsequent combustion events when the peak pressure is above a selected value and to increase the peak pressure during subsequent combustion events when the peak pressure is below a selected value, said selected value being greater than said established value.

2. An internal combustion engine having a combustion chamber in which a series of combustion events occur and a closed loop combustion pressure control, said control comprising a transducer responsive to the pressure in said combustion chamber, means operated by said transducer to create a control pressure signal which varies with the duration the pressure in said combustion chamber exceeds an established value and thus varies with the peak pressure in said combustion chamber, and a servomotor for regulating a combustion parameter in response to variations in said control pressure signal and adapted to regulate said combustion parameter to decrease the peak pressure in said combustion chamber during subsequent combustion events when the peak pressure is above a selected value and to increase the peak pressure during subsequent combustion events when the peak pressure is below a selected value, said selected value being greater than said established value.

3. An internal combustion engine having a combustion chamber in which a series of combustion events occur, an ignition system for initiating said combustion events, and a closed loop combustion pressure control, said control comprising means including a transducer responsive to the pressure in said combustion chamber for creating a control signal which varies with the duration the pressure in said combustion chamber remains above an established value and thus varies with the peak pressure in said combustion chamber, and means responsive to said control signal for regulating the ignition timing, and wherein said signal creating means increases said control signal to cause said signal responsive means to retard the ignition timing and thereby decrease the peak pressure of subsequent combustion events when the peak pressure is above a selected value and decreases said control signal to cause said signal responsive means to advance the ignition timing and thereby increase the peak pressure of subsequent combustion events when the peak pressure is below said selected value, said selected value being greater than said established value.

4. An internal combustion engine having a combustion chamber in which a series of combustion events occur, an ignition system for initiating said combustion events, an induction passage for air flow to the combustion chamber, a servomotor connected to said induction passage and subjected to a pressure signal created therein for regulating the ignition timing, and a closed loop combustion pressure control, said control comprising a switch responsive to the pressure in said combustion chamber, a solenoid energized by said switch while the pressure in said chamber exceeds an established value and thus for a duration which varies with the peak pressure in said chamber, an air vent opening to said servomotor, and a valve operated by said solenoid for permitting air flow through said vent to said servomotor while said solenoid is energized to create a control pressure signal in said servomotor which varies with the duration said solenoid is energized and thus varies with the peak pressure in said combustion chamber, and wherein said servomotor retards the ignition timing to thereby decrease the peak pressure of subsequent combustion events upon an increase in said control pressure signal indicative of peak pressure above a selected value and advances the ignition timing to thereby increase the peak pressure of subsequent combustion events upon a decrease in said control pressure signal indicative of peak pressure below a selected value, said selected value being greater than said established value.

5. An internal combustion engine having a combustion chamber in which a series of combustion events occur, an induction passage for air flow to the combustion chamber, an exhaust passage for exhaust flow from the combustion chamber, a recirculation passage extending from said exhaust passage to said induction passage for recirculation of exhaust gases to said combustion chamber, and a closed loop combustion pressure control, said control comprising means including a transducer responsive to the pressure in said combustion chamber for creating a control signal which varies with the duration the pressure in said combustion chamber exceeds an established value and thus varies with the peak pressure in said chamber, a valve member for regulating flow through said recirculation passage, and means responsive to said control signal for positioning said valve member, and wherein said signal creating means decreases said control signal to cause said signal responsive means to position said valve member for increased recirculation and thereby decrease the peak pressure of subsequent combustion events when the peak pressure is above a selected value and increases said control signal to cause said signal responsive means to position said valve member for decreased recirculation and thereby increase the peak pressure of subsequent combustion events when the peak pressure is below said selected value.

6. An internal combustion engine having a combustion chamber in which a series of combustion events occur, an induction passage for air flow to said combustion chamber, an exhaust passage for exhaust flow from said combustion chamber, a recirculation passage extending from said exhaust passage to said induction passage for recirculation of exhaust gases to said combustion chamber, and a closed loop combustion pressure control, said control comprising a switch responsive to the pressure in said combustion chamber, a solenoid energizable by said switch while the pressure in said chamber exceeds an established value and thus for a duration which varies with the peak pressure in said chamber, passage means receiving a pressure signal created in said induction passage and atmospheric pressure, a signal valve operated by said solenoid for controlling flow through said passage means to create a control pressure signal, a valve member positionable in said recirculation passage to control exhaust gas flow therethrough, and a servomotor responsive to said control pressure signal for positioning said valve member, and wherein said signal valve decreases said control pressure signal to cause said servomotor to position said valve member for increased recirculation and thereby decrease the peak pressure of subsequent combustion events when the peak pressure is above a selected value and increases said control pressure signal to cause said servomotor to position said valve member for decreased recirculation and thereby increase the peak pressure of subsequent combustion events when the peak pressure is below a selected value.

7. The method of controlling an internal combustion engine having a combustion chamber in which a series of combustion events occur, said method comprising sensing the duration of time the pressure in said chamber is above an established level, creating a control signal which varies with said duration and thus varies with the peak pressure in said chamber, and regulating a combustion parameter in accordance with said signal to decrease the peak pressure of subsequent combustion events when the peak pressure is above a selected value and to increase the peak pressure of subsequent combustion events when the peak pressure is below a selected value, said selected value being greater than said established value.

* * * * *